W. C. FAWKES.
GARDEN SPRINKLER.
APPLICATION FILED APR. 6, 1917.
1,297,818.
Patented Mar. 18, 1919.
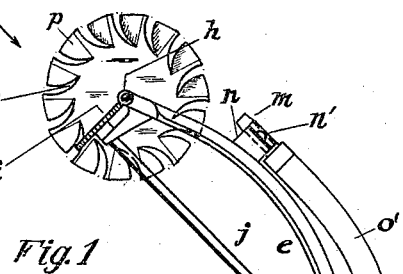
Fig.1
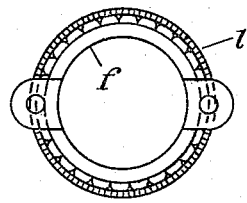
Fig.6
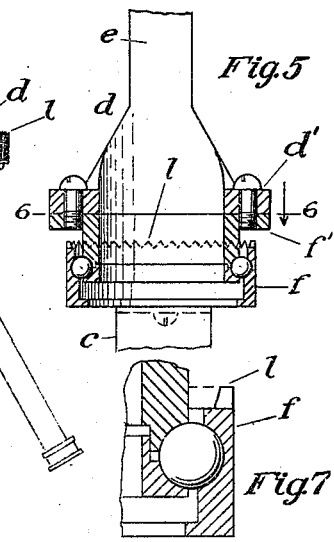
Fig.5
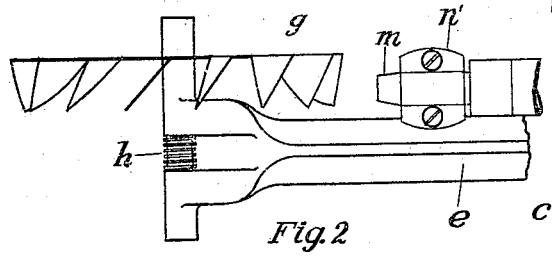
Fig.2
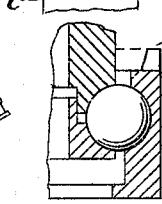
Fig.7
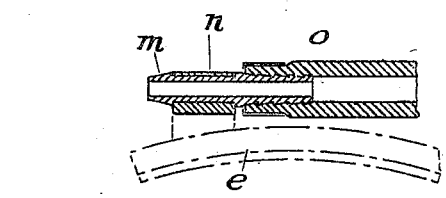
Fig.4
Fig.9
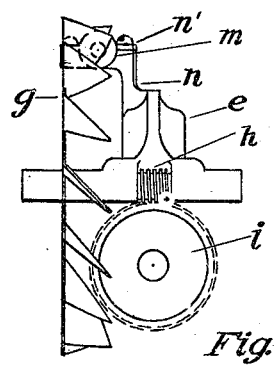
Fig.3
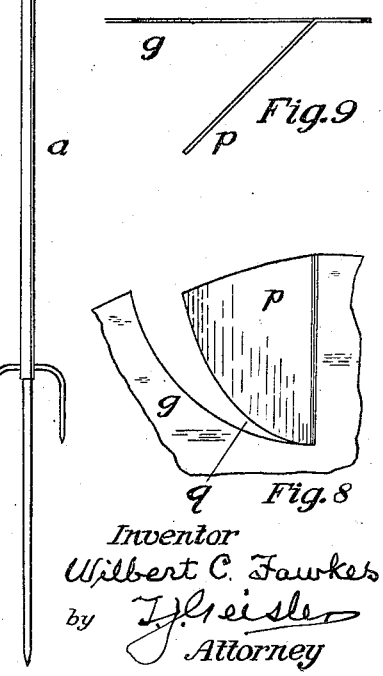
Fig.8
Inventor
Wilbert C. Fawkes
by T. J. Geisler
Attorney

UNITED STATES PATENT OFFICE.

WILBERT C. FAWKES, OF PORTLAND, OREGON, ASSIGNOR OF ONE-HALF TO WILLIAM R. R. BEIER, ONE-FOURTH TO BERNARD METZGER, AND ONE-FOURTH TO ALBERT MEYER, ALL OF PORTLAND, OREGON.

GARDEN-SPRINKLER.

1,297,818.     Specification of Letters Patent.     Patented Mar. 18, 1919.

Application filed April 6, 1917. Serial No. 160,294.

*To all whom it may concern:*

Be it known that I, WILBERT C. FAWKES, a citizen of the United States, and a resident of the city of Portland, county of Multnomah, State of Oregon, have invented a certain new and useful Improvement in Garden-Sprinklers, of which the following is a specification.

My invention relates to portable garden sprinklers, driven by the jet of water delivered from a garden hose, and operating to distribute the water discharged from the hose over a circular area about the sprinkler.

The object of my invention is to provide an efficient sprinkler, of said type, of simple construction. Furthermore, to provide my sprinkler with means for attaching and supporting a hose without twisting or wrenching of the latter in the continuous operation of the sprinkler, for, as obvious, the twisting and wrenching of the hose soon puts it into a leaky condition. Furthermore, to adapt my sprinkler to throw the water in the form of a spray circularly about the sprinkler, and avoid dropping too much water on the spot on which the sprinkler is mounted. The latter is obviously undesirable, and, besides, since portable sprinklers are usually supported on the ground by means of a rod-like standard driven into the ground, when the latter is rendered soft by soaking the sprinkler is apt to topple over.

I attain my object in a device comprising a rod-like standard adapted to be driven into and supported by the ground, on which is mounted an arm having an annular base, and is rotatable in a horizontal plane, and carries in its extremity an impact water-wheel the blades of which are adapted to deflect the water impinged thereon in the form of a spray. My device further includes means operating to rotate the arm by the rotation of the water wheel, a nozzle rotatably supported by the arm and adapted for impinging the water delivered therethrough on the blades of the water wheel, and thus cause the latter's rotation, and means are provided for coupling a garden hose to said nozzle, whereby the hose, attached to said nozzle, will be positioned coincidentally with the axis of rotation of said arm, so that the latter may freely rotate, but will cause no undue twisting or wrenching of the hose.

Furthermore, the blades of the water wheel are given a special shape and angle, so as to deflect the water in the form of a spray and prevent an excess from dropping down on the ground immediately about the sprinkler.

These and other features of my invention are hereinafter fully described, reference being had to the accompanying drawings, in which:

Figure 1 is a side elevation of my device;

Fig. 2 is a top view of a detail of the rotating arm, the water wheel and the nozzle journaled in the extremity of the arm adapted for impinging on the water wheel;

Fig. 3 is a view looking in the direction pointed by the arrow in Fig. 1, showing said rotatable arm, the water wheel, the nozzle directed against the blades of the latter, and part of the means for transmitting motion from the water wheel to rotate said arm;

Fig. 4 is a longitudinal section of the nozzle showing a hose end as coupled thereto, and in dotted line showing a portion of the rotated arm carrying the nozzle;

Fig. 5 is a detail of the rotatable mounting of the arm on the standard;

Fig. 6 is a top view below the line 6—6;

Fig. 7 is a detail of the arrangement of the ball-bearing for the rotated arm;

Fig. 8 is a detail of one of the blades of the water wheel; and

Fig. 9 is a diagrammatic view of a portion of the water wheel, showing the angle at which the blades are disposed from the plane of the main body of the water wheel.

The rod-like standard, $a$, is provided with means at its lower end, as at $b$, for driving the same into the ground and securely holding the device in upright position. A fork $c$ is fastened to the top of the standard, and on the fork is mounted the annular or ring-like base $d$ of the arm $e$ by means permitting the latter to be rotated in a horizontal plane. Such means may be constructed as shown in Fig. 5, consisting of a ball-bearing $f$, provided with a flange $f'$ on which the base of the arm $e$ is secured, as shown at $d'$. The arm $e$ is curved as shown, and at the extremity thereof is journaled a water wheel $g$, rotatable in a vertical plane. Motion is transmitted from the water wheel $g$ to the base $d$ of the arm $e$, so as to rotate the latter; and to this end the shaft $j$ of the water wheel is provided with a worm $h$ meshing with a pinion $i$ on the shaft $j$, on the lower end of which shaft is mounted a pinion $k$, in mesh with a crown wheel $l$ on the periphery of the lower part of the annular ball-bearing support for the base of the arm $e$. A shouldered nozzle $m$ is rotatably supported on the arm $e$ by a sleeve bracket $n$, having a removable cap $n'$, the nozzle being arranged so as to impinge the stream of water delivered therethrough upon the blades of the water wheel $g$. The garden hose is coupled to the nozzle as shown by $o$.

I find it convenient to provide my sprinkler with a short coupling piece of hose, as shown by $o'$ in Fig. 1, to which the garden hose is coupled. The garden hose, or the coupling section $o''$, is inserted through the open part of the annular base $d$ of the arm $e$, and its ball-bearing support $f$, thus arranging the portion of the hose extending through said bearing and base coincidental with the axis of rotation of the arm $e$; and since the nozzle $n$ is rotatably supported on the arm $e$, the hose section extending through the base of the latter will not be unduly twisted or wrenched by the rotation of the arm $e$. The blades $p$ of the water wheel $g$ are constructed and arranged as shown in Figs. 8 and 9. They are turned approximately at the angle shown in Fig. 9 with respect to the plane of the main body of the water wheel; and as shown in Fig. 8, the blades are wider at the top and recede toward their inner part, that is to say, toward the axis of rotation of the water wheel, and the lower part of the blade is curved inwardly as shown by $q$.

I claim:

1. A sprinkler comprising a supporting standard, a crown wheel supported by the top of the latter, an arm having an annular supporting base rotatably mounted on the standard, a water wheel rotatable in a vertical plane at the extremity of the arm, a shaft journaled in said arm, a worm-and-gear element transmitting motion from the water wheel to said shaft, a pinion on the shaft in mesh with said crown wheel, and means for rotatably supporting a nozzle on said arm to impinge on said water wheel.

2. A sprinkler comprising a supporting standard, a crown wheel supported by the top of the latter, an arm having an annular supporting base rotatably mounted on the standard, a water wheel rotatable in a vertical plane at the extremity of the arm, a shaft journaled in said arm, a worm-and-gear element transmitting motion from the water wheel to said shaft, a pinion on the shaft in mesh with said crown wheel, and a nozzle rotatably supported on said arm to impinge on said water wheel.

3. A sprinkler comprising a supporting standard terminating in a fork at its upper end, a crown wheel supported by said fork, an arm having an annular supporting base rotatably mounted on the standard, a water wheel rotatable in a vertical plane at the extremity of the arm, a shaft journaled in said arm, a worm-and-gear element transmitting motion from the water wheel to said shaft, a pinion on the shaft in mesh with said crown wheel, and means for rotatably supporting a nozzle on said arm to impinge on said water wheel.

4. A sprinkler comprising a supporting standard terminating in a fork at its upper end, a crown wheel supported by said fork, an arm having an annular supporting base rotatably mounted on the standard, a water wheel rotatable in a vertical plane at the extremity of the arm, a shaft journaled in said arm, a worm-and-gear element transmitting motion from the water wheel to said shaft, a pinion on the shaft in mesh with said crown wheel, and a nozzle rotatably supported on said arm to impinge on said water wheel.

WILBERT C. FAWKES.

Copies of this patent may be obtained for five cents each, by addressing the "Commissioner of Patents, Washington, D. C."